V. W. ALEXANDER.
COUPON ENVELOP.
APPLICATION FILED OCT. 16, 1916.
1,265,159.
Patented May 7, 1918.
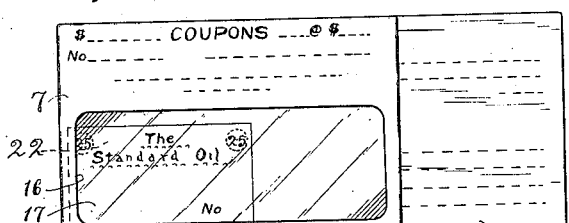
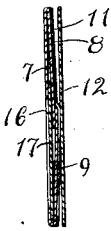
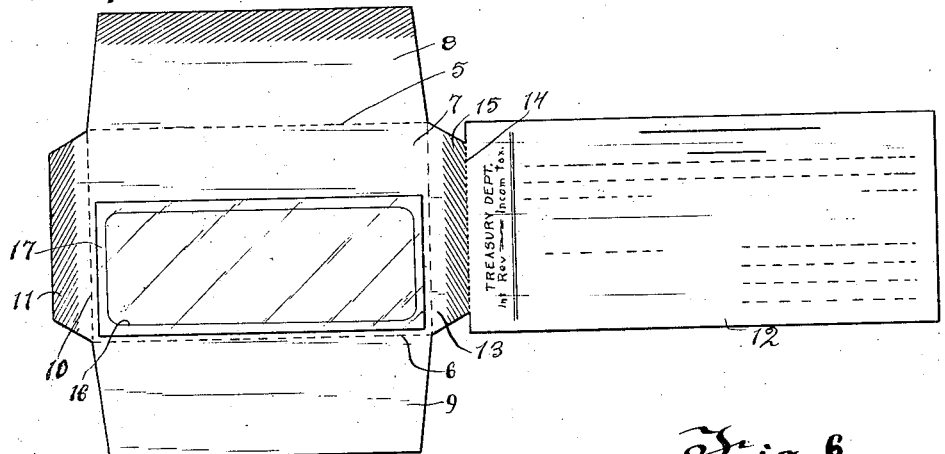
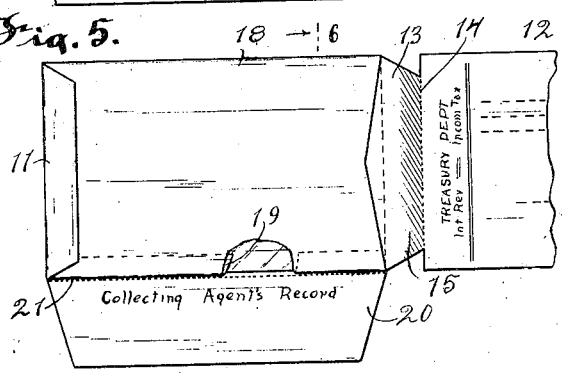
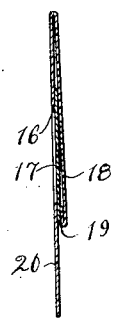
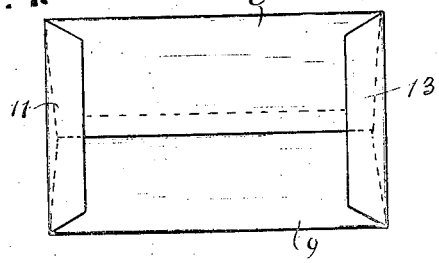
INVENTOR
Victor W. Alexander.
By Morsell, Keeney & French,
ATTORNEYS

UNITED STATES PATENT OFFICE.

VICTOR W. ALEXANDER, OF MILWAUKEE, WISCONSIN.

COUPON-ENVELOP.

1,265,159.  Specification of Letters Patent.  Patented May 7, 1918.

Application filed October 16, 1916. Serial No. 125,781.

*To all whom it may concern:*

Be it known that I, VICTOR W. ALEXANDER, a citizen of the United States, and resident of Milwaukee, in the county of Milwaukee and State of Wisconsin, have invented new and useful Improvements in Coupon-Envelops, of which the following is a description, reference being had to the accompanying drawings, which are a part of this specification.

The invention relates to coupon envelops.

In the collection of coupons, which are rarely made payable to other than bearer, detached from bonds issued by Governments, municipalities, corporations, individuals, etc., any organization or individual acting as a collecting agency, hereinafter referred to as "collecting agent", finds it essential, for record and efficient disposition of coupon collections, to inclose the coupons in coupon envelops, a separate envelop for each owner and issue.

To properly prepare these envelops and coupons for transit to the paying agency, it has been the practice for the collecting agent to inclose the coupons in ordinary envelops, printed in a form that requires the filling in on the face thereof, the names of the companies issuing the bonds, the due dates of the coupons, and the names and addresses of the institutions, organizations or individuals to whom these coupons must be presented for payment, hereinafter referred to as "paying agent". This information is usually imprinted on the face of the coupons either by printing, engraving or lithographing.

From the time these coupons are accepted by the individual representing the collecting agent until they are inclosed in a package suitable for transmission either through the United States mails or some express company, they pass unsealed through several departments, referring more particularly in this instance to trust and banking institutions, each department of which finds it necessary to open the envelop to compare the coupon with the information written on the face thereof to make sure that the envelop contains the coupons; that the proper coupon is inclosed in the right envelop, and that the coupon itself will be presented for payment exactly wherein intended.

In the medium and larger financial institutions, several clerks are in charge of the final ensealing of the coupon envelops. In the event of an error having occurred, it is a difficult matter to hold a certain individual to account.

The Federal income tax law provides that all coupons accepted for collection by a collecting agent or payment at the source, except those of the United States Government, or any municipality, must be accompanied by an affidavit of ownership signed by the owner of the coupon, giving the full post-office address, and further stating whether or not exemption from the Federal income tax is claimed.

The Federal authorities have prescribed various forms to meet the various conditions. All affidavits must be of uniform size, form and color. For instance, an affidavit made out on a white sheet is to attract immediate attention to the fact that the owner does not claim exemption from the normal Federal tax of one per cent., computed on the amount of the coupons attached; the yellow, that the owner does, etc. It frequently happens that while the coupons are being listed on the collecting agent's records, the affidavits which are generally pinned to the envelop containing them, are detached and reattached to coupon envelops containing coupons that belong to some other owner. The collecting agent has consequently placed itself in a position necessitating, primarily with its clients or depositors, embarrassing apology.

The use of the ordinary envelop for coupon collections which requires a great amount of time necessary to perform the detail work of filling in the information on the face thereof increases the possibility for inclosing coupons in incorrectly filled-in envelops; inclosing wrong coupons; failure to inclose coupons; attaching the wrong affidavits and the accidental extraction of coupons from the envelops before sealing them, which necessitates the re-opening of all the envelops previously handled to locate the empty one.

In the event that the collecting agent should lose, destroy, have stolen, or in any manner be unable to present the coupon at the paying agent's office, they are required to satisfactorily indemnify the paying agent for double the amount of the coupon.

The object of my invention is to produce a coupon envelop so constructed that it can be immediately sealed upon inclosing coupons; that the coupon itself is always in evidence for record and comparison; a coupon envelop that will save the time necessary to perform and eliminate the aforementioned detail work; guard against the possibility of errors; and have attached but readily detachable the prescribed Federal affidavit of ownership and income.

The form used as a collection record by collecting agents varies, but this envelop can be so constructed with a perforated or notched tab or stub attached thereto, that will, when detached act as a permanent record for the collecting agent, designating by its color whether or not the owner of the coupons inclosed in that envelop, of which that tab or stub originally was a part, did, or did not, claim exemption from the Federal tax.

Aside from the form of affidavit prescribed by the Federal authorities the envelop, or the envelop and stub or tab, or the envelop and stubs and tabs, will be printed in any form desired by the collecting agent.

The invention further consists in the several features hereinafter set forth and more particularly defined by claims at the conclusion hereof.

In the drawings:

Figure 1 is a front view of the envelop embodying the invention;

Fig. 2 is a view of the blank from which the envelop is formed;

Fig. 3 is a section taken on the line 3—3 of Fig. 1;

Fig. 4 is a rear view of the envelop showing the income tax blank removed;

Fig. 5 is a modified form of envelop showing the collecting agent's stub attached thereto;

Fig. 6 is a section taken on the line 6—6 of Fig. 5.

The envelop shown in Figs. 1 to 4, is preferably formed of a single piece of paper folded on the lines 5 and 6 to form a front 7 and flaps 8 and 9 which are brought into overlapping relation and then sealed together and is also folded on the line 10 to form a flap 11 which is secured to the flaps 8 and 9 to close up the bottom of the envelop. The front 7 projects laterally forming an extension which consists of a blank 12 in the form of an income tax affidavit and having the necessary printed matter thereon and a sealing flap 13, which parts may be readily separated from each other on the perforated line 14, the outer end of the flap 13 having a coating of adhesive 15 applied thereto to secure it in closed position as shown in Fig. 4.

The front of the envelop is provided with an opening 16 which is covered over by a piece of transparent material 17, such as transparent paper, secured to the inside of the front adjacent said opening in any suitable manner.

The color of the paper forming the envelop is made to correspond with the required color of the Government affidavit.

The construction shown in Figs. 5 and 6 is similar in all respects to the construction previously described except that the back is formed by a flap 18 which is folded over to form a flap 19 which is secured to the front 7 and one side of the front 7 extends laterally to form a collecting agent's stub or tab 20 which may be readily separated from the envelop proper along the line of perforations 21.

With the constructions above described the coupon 22 to be collected is placed in the envelop face to the front so that the coupon is plainly visible through the sight opening in the envelop and the envelop sealed by pasting down the flap 13. Before the coupon is paid the income tax blank 12 is filled out and when the coupon is paid the tax blank 12 is readily detached and sent to the Treasury Department. The stub or tab 20 if used with the envelop will serve as a permanent record for the collecting agent.

It will be observed that when the flap 13 is sealed to close the envelop, the blank 12 will extend to the rear side of the envelop and with its free end projecting beyond the end opposite to the pasted end, so that a portion of the matter printed or inscribed on the blank, will be visible from the transparent side of the envelop. In this position, it will be readily seen, that the matter on the blank can be compared with the inscription on the coupon without reversing the envelop or blank. In fact, the projecting end of the blank 12 can contain all of the inscribed matter necessary to identify the inclosed coupon, so that the two can be compared without raising the envelop from the blank.

The invention thus exemplifies a simple and efficient envelop for facilitating the collecting and handling of coupons.

What I claim as my invention is:

1. The combination with an envelop constructed to seal a coupon therein and also permit a view of the data upon said coupon while inclosed, of a detachable leaf projecting from one edge of said envelop and provided with data to form an income tax blank relating to the inclosed coupon, whereby the coupon is in sight for record and comparison with the income tax blank data while inclosed against removal.

2. The combination with an envelop constructed to seal a coupon therein and also permit a view of the data upon said coupon while inclosed, of a detachable leaf projecting from one edge of said envelop and provided with data to form an income tax blank relating to the inclosed coupon, said leaf being arranged to fold against the envelop, and a second leaf projecting from another edge of said envelop and also provided with data in blank relating to said coupon, whereby the coupon is in sight for record and comparison with the income tax blank data and also the blank data on said second leaf while the coupon is inclosed against removal.

3. The combination with an envelop constructed to seal a coupon therein and having a transparent wall to permit a view of the data upon said coupon while inclosed, of a detachable leaf projecting from one edge of said envelop and provided with data to form an income tax blank relating to the inclosed coupon, said leaf being arranged to fold against said envelop on the side opposite to said transparent wall, whereby the coupon is in sight for record and comparison with the income tax blank data while inclosed against removal.

4. The combination with an envelop constructed to seal a coupon therein and having a transparent wall to permit a view of the data upon said coupon while inclosed, of a detachable leaf projecting from one edge of said envelop and provided with data to form an income tax blank relating to the inclosed coupon, said leaf being arranged to fold against said envelop on the side opposite to said transparent wall and also having sufficient length as to have one end project beyond the edge of the envelop when in its folded position, whereby the data upon the projecting end portion of said leaf will be visible from the transparent side of the envelop.

5. The combination with an envelop constructed to seal a coupon therein and having a normally open end and a transparent wall to permit a view of the data upon said coupon while inclosed, of a detachable leaf projecting from one edge of said envelop and provided with data to form an income tax blank relating to the inclosed coupon, said leaf having a portion constructed to form a sealing flap for the open end of the envelop when said leaf is folded against the envelop on the side opposite to the transparent wall, whereby the coupon is in sight for record and comparison with the income tax blank data while inclosed against removal.

6. An income tax blank having means formed integral therewith for permanently inclosing and at the same time displaying the data on a correlative coupon, said blank and inclosing means being readily detachable from each other.

7. An envelop having a transparent wall on one side through which data upon a coupon can be viewed when sealed therein, and a sealing flap having an integral extension provided with data to form an income tax blank relating to said coupon, said extension being connected to said sealing flap in a manner to fold with the sealing flap against the side of the envelop opposite to the transparent wall and project freely from said sealing flap.

8. The combination with an envelop constructed to receive a coupon and also permit a view of the data upon the coupon while inclosed therein, of a detachable leaf connected to the envelop and provided with data to form an income tax blank relating to the inclosed coupon, whereby the data on the coupon and income tax blank may be readily compared.

In testimony whereof, I affix my signature.

VICTOR W. ALEXANDER.